(12) United States Patent
Akutagawa

(10) Patent No.: US 7,659,511 B2
(45) Date of Patent: Feb. 9, 2010

(54) IMAGE PICKUP APPARATUS, IMAGE DISPLAY SYSTEM, AND METHOD FOR CONTROLLING THE IMAGE PICKUP APPARATUS

(75) Inventor: Kiyoshi Akutagawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 92 days.

(21) Appl. No.: 12/020,525

(22) Filed: Jan. 26, 2008

(65) Prior Publication Data

US 2008/0251725 A1   Oct. 16, 2008

(30) Foreign Application Priority Data

Mar. 2, 2007   (JP) ............................ 2007-052948

(51) Int. Cl.
*G01J 5/02* (2006.01)
(52) U.S. Cl. ............................ 250/339.05; 250/339.01; 250/340
(58) Field of Classification Search ................. 250/340, 250/339.01, 339.05
See application file for complete search history.

(56) References Cited

U.S. PATENT DOCUMENTS

| | | | |
|---|---|---|---|
| 4,602,281 A | | 7/1986 | Nagasaki et al. |
| 5,006,710 A | * | 4/1991 | Powell ........................ 250/340 |
| 5,677,532 A | * | 10/1997 | Duncan et al. ......... 250/339.15 |
| 6,871,409 B2 | * | 3/2005 | Robb et al. .................... 33/288 |
| 2003/0128737 A1 | * | 7/2003 | McGrath et al. ............ 374/161 |
| 2005/0074221 A1 | | 4/2005 | Remillard et al. |
| 2005/0231713 A1 | * | 10/2005 | Owen et al. .............. 356/237.1 |

FOREIGN PATENT DOCUMENTS

JP   2-304680   12/1990

* cited by examiner

*Primary Examiner*—David P Porta
*Assistant Examiner*—Jessica L Eley
(74) *Attorney, Agent, or Firm*—Young Basile

(57) ABSTRACT

An image pickup apparatus includes an irradiation unit for radiating, to an object, light having a plurality of wavelength regions, and an image pickup unit for picking up an image that is obtained when the light having the wavelength regions is radiated by the irradiation unit and an image that is obtained when the light is not radiated by the irradiation unit. Based on both images, a wavelength region from among the wavelength regions is determined in which the intensity of external light is low. The irradiation unit is then controlled to radiate light having an increased emission intensity for the light having the wavelength region in which the intensity of external light is low.

20 Claims, 6 Drawing Sheets

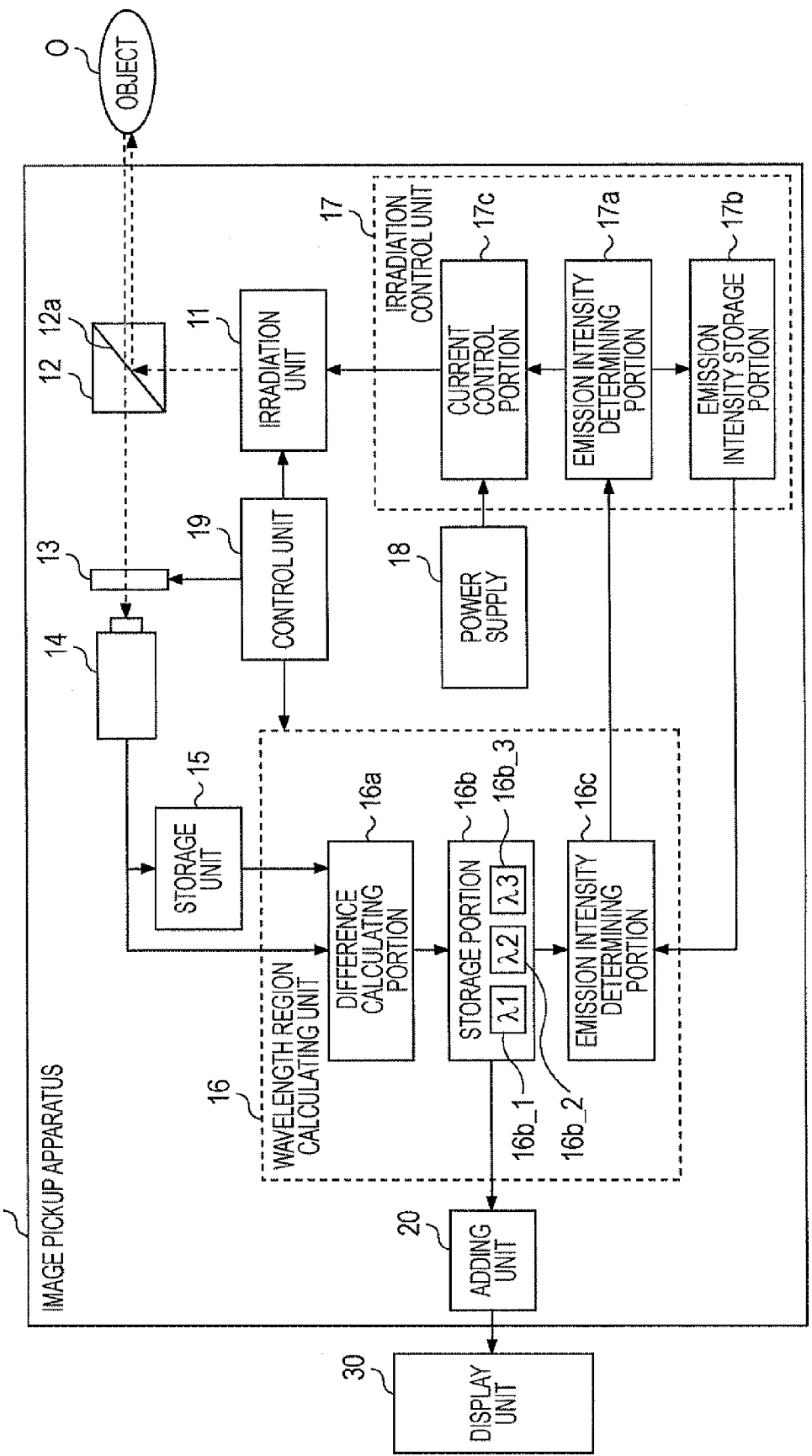

IMAGE PICKUP APPARATUS, IMAGE DISPLAY SYSTEM, AND METHOD FOR CONTROLLING THE IMAGE PICKUP APPARATUS

CROSS-REFERENCE TO RELATED APPLICATION

This application claims priority from Japanese Patent Application Serial No. 2007-052948, filed Mar. 2, 2007, which is incorporated herein in its entirety by reference.

TECHNICAL FIELD

The invention generally relates to an image pickup apparatus and image display system for picking up infrared images, and to a method for controlling the image pickup apparatus.

BACKGROUND

Hitherto, an image pickup apparatus that picks up images of an object by radiating infrared radiation to the object and capturing light reflected by the object has been known from, for example, Japanese Unexamined Patent Application Publication No. 2-304680.

Such an image pickup apparatus can determine a difference between an image obtained when infrared radiation is not radiated and an image obtained when infrared radiation is radiated. When infrared radiation is not radiated, external light impinges on the object and is reflected by the object. Thus, light picked up by the image pickup apparatus is only an external light component. In contrast when infrared radiation is radiated, external light and infrared radiation impinge on the object and are reflected by the object. Thus, the light picked up by the image pickup apparatus includes an external light component and an infrared component. The difference between the image obtained when infrared radiation is not radiated and the image obtained when infrared radiation is radiated is an image in which the external light component is canceled and only the infrared component is extracted. Accordingly, this image pickup apparatus can obtain an image in which the influence of external light is suppressed.

BRIEF SUMMARY

Taught herein are embodiments of an image pickup apparatus, an image display system including an image pickup apparatus and a control method for an image pickup apparatus.

One method taught herein comprises, for example, picking up a first image of an object when radiated light having a plurality of wavelength regions is irradiated to the object, picking up a second image of the object in an absence of the radiated light, determining a wavelength region among the plurality of wavelength regions in which intensity of external light is low based on the first image and the second image and irradiating the radiated light in a state in which an emission intensity of light having the determined wavelength region is increased.

This and other embodiments of the invention are described in more detail hereinafter.

BRIEF DESCRIPTION OF THE DRAWINGS

The description herein makes reference to the accompanying drawings wherein like reference numerals refer to like parts throughout the several views, and wherein:

FIG. 1 is a block diagram showing an image display system including an image pickup apparatus according to an embodiment of the invention;

Figure 2A:
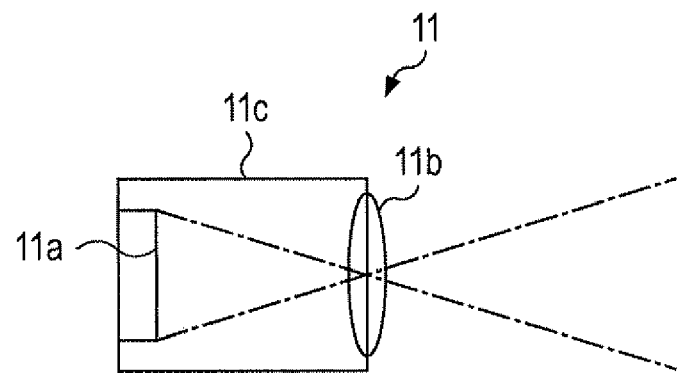
FIG. 2A is a detailed illustration of the irradiation unit shown in FIG. 1.

DETAILED DESCRIPTION OF EMBODIMENTS OF THE INVENTION in a known image pickup apparatus such as that previously described, the apparatus radiates infrared radiation having a predetermined wavelength component. In an external light environment in which the light intensity of the predetermined wavelength component is high, such as an entrance to a tunnel, the amount of suppression of external light is small. Accordingly, even if the image difference is determined as described, a clear image is difficult to obtain.

In contrast, embodiments of the invention pick up a clear image in accordance with a state of external light and are described with reference to the drawing figures.

As shown in FIG. 1, the image display system 1 includes the image pickup apparatus 10 and a display unit 30. The image display system 1 displays, on the display unit 30, an image picked up by the image pickup apparatus 10 that includes the object O. Although an image picked up by the image pickup apparatus 10 is displayed on the display unit 30 in this embodiment, display of the image on the display unit 30 is not required. Instead or in addition thereto, the image picked up by the image pickup apparatus 10 may be used for processing such as image processing to detect the position of the object O.

The image pickup apparatus 10 includes an irradiation unit 11, an optical splitter 12, an optical filter 13, a camera 14, a storage unit 15, a wavelength region calculating unit 16, an irradiation control unit 17, a power supply 18, a control unit 19 and an adding unit 20. The wavelength region calculating unit 16, the irradiation control unit 17, the control unit 19 and the adding unit 20 can be implemented by, for example, one or more microcomputers including a random access memory (RAM), a read-only memory (ROM), a central processing unit (CPU), etc., in addition to various input and output connections. Generally, the functions described herein for these units and their respective portions are performed by execution of one or more software programs stored in ROM by the CPU.

Of course, some or all of the functions described for the units could alternatively be performed in whole or in part by hardware components.

Figure 2B:
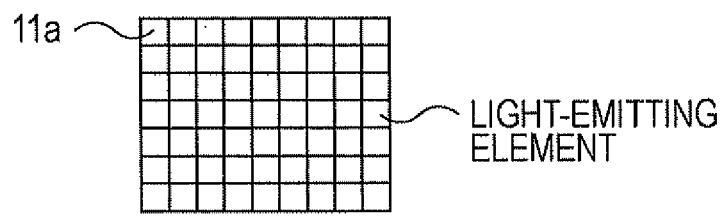
FIG. 2B is a detailed illustration of a portion of the irradiation unit shown in FIG. 1.

The irradiation unit 11 includes, for example, light-emitting diodes, and radiates light having a plurality of wavelength regions to a predetermined irradiation range. FIGS. 2A and 2B are detailed illustrations of the irradiation unit 11. As shown in FIG. 2A, the irradiation unit 11 has an emission portion 11a, a lens 11b, and a housing 11c. As shown in FIG. 2B, the emission portion 11a is an LED (light emitting diode) unit in which light-emitting regions corresponding to light-emitting elements are arranged in a matrix having ten vertical regions by ten horizontal regions. Each light-emitting region can radiate light having a plurality of predetermined wavelength regions.

When the image display system 1 is installed in a vehicle, each light-emitting element can radiate light having three wavelength regions in a wavelength (near infrared) range of 700 to 1000 nm. When center wavelengths in the near infrared region are represented by, for example, $\lambda 1$, $\lambda 2$, and $\lambda 3$, the light-emitting element can radiate light having wavelength width $\Delta\lambda$ around each center wavelength. Under the control of the control unit 19, the light-emitting element can time-divisionally output radiated light having center wavelength $\lambda 1$, radiated light having center wavelength $\lambda 2$ and radiated light having center wavelength $\lambda 3$. The light radiated by the light-emitting element passes through the lens 11b, which is fixed to the housing 11c, and is input to the optical splitter 12.

As shown in FIG. 1, the optical splitter 12 has therein a half mirror 12a. The half mirror 12a reflects the light from the irradiation unit 11. Reflection by the half mirror 12a is directed to the object O. Reflected light (including both light in which the radiated light from the image pickup apparatus 10 is reflected and light in which the external light is reflected) from the object O is incident on the optical splitter 12. The reflected light passes through the half mirror 12a and is input to the optical filter 13.

The optical filter 13 is a filter that can select a wavelength to be transmitted. A transmission wavelength can be changed based on the control of the control unit 19. Here, the optical filter 13 is controlled to only transmit the light having the wavelength regions radiated by the irradiation unit 11.

By receiving the reflected light from the object O and photoelectrically converting the light, the camera 14 obtains picked-up-image data including an image of the object O. In addition, based on time-divisional control, the irradiation unit 11 switches between a state in which the irradiation unit 11 radiates light and a state in which the irradiation unit 11 does not radiate light. Accordingly, when light having wavelength regions is radiated by the irradiation unit 11, the camera 14 obtains picked-up-image data (irradiation-mode picked-up-image data) by receiving reflected light including light in which the external light is reflected by the object O and light in which the radiated light is reflected by the object O. When the light having wavelength regions is not radiated by the irradiation unit 11, the camera 14 obtains picked-up-image data (non-irradiation-mode picked-up-image data) by receiving reflected light including only light in which the external light is reflected by the object O.

The storage unit 15 stores the irradiation-mode picked-up-image data obtained by the camera 14. The storage unit 15 may store only the non-irradiation-mode picked-up-image data obtained when the light is not radiated by the irradiation unit 11, or both the irradiation-mode picked-up-image data and the non-irradiation-mode picked-up-image data. The storage unit 15 could be stand-alone memory as shown or could be integrated memory of the one or more microcomputers of the image pickup apparatus 10 or the camera 14 described above Based on both images, that is, the irradiation-mode picked-up-image data and the non-irradiation-mode picked-up-image data, the wavelength region calculating unit 16 determines, among the wavelength regions, a wavelength in which the intensity of the external light is lowest. The wavelength region calculating unit 16 includes a difference calculating portion 16a, a storage portion 16b and a calculation portion 16c.

The difference calculating portion 16a determines a difference between the irradiation-mode picked-up-image data and the non-irradiation-mode picked-up-image data for each of the wavelength regions. More specifically, the difference calculating portion 16a determines a difference value (that is, a first difference value) between first irradiation-mode picked-up-image data obtained when light having center wavelength $\lambda 1$ is radiated and the non-irradiation-mode picked-up-image data obtained when the light is not radiated. In addition, the difference calculating portion 16a determines a difference value (that is, a second difference value) between second irradiation-mode picked-up-image data obtained when light having center wavelength $\lambda 2$ is radiated and the non-irradiation-mode picked-up-image data, and determines a difference value (that is, a third difference value) between third irradiation-mode picked-up-image data obtained when light having center wavelength $\lambda 3$ is irradiated and the non-irradiation-mode picked-up-image data.

The storage portion 16b separately stores the first to third difference values determined by the difference calculating portion 16a. The storage portion 16b has an internal configuration in which the storage portion 16b is logically or physically divided into a first-difference-value storage area 16b_1, a second-difference-value storage area 16b_2, and a third-difference-value storage area 16b_3. The storage portion 16b has a storage capacity capable of storing each difference value m times. Specifically, the storage portion 16b includes an image memory for storing difference values (i.e., difference images) for m images having numbers 1 to m assigned in a time-series manner. Whenever a new difference value is determined, in the storage portion 16b the above number is incremented by "1" and the new difference value is stored in the image memory. After the number reaches the predetermined value m, when a new difference value is determined the number returns to "1". In addition, the storage portion 16b outputs the sum (i.e., a total difference value) of m difference values to the calculation portion 16c.

Based on the total difference value stored in the storage portion 16b, the calculation portion 16c determines, among the wavelength regions, a wavelength region in which the intensity of the external light is lowest. A calculation method by the calculation portion 16c is described. When a reflectance of the object O at specified wavelength $\lambda$ is represented by $R(\lambda)$, the intensity of the external light at specified wavelength $\lambda$ is represented by $Pe(\lambda)$, the intensity of the radiated light at specified wavelength $\lambda$ is represented by $Ps(\lambda)$, and a total of wavelength characteristics of optical components included in the optical splitter 12, the optical filter 13 and the camera 14 and a wavelength characteristic in an image pickup mode is represented by $\alpha(\lambda)$, a signal value Ion of a picked-up image in the irradiation mode and a signal value Ioff of a picked-up image in the non-irradiation mode are represented by the following equations:

$$Ion(\lambda) = \log(\alpha(\lambda) \times R(\lambda) \times (Pe(\lambda) + Ps(\lambda))); \text{ and} \quad (1)$$

$$Ioff(\lambda) = \log(\alpha(\lambda) \times R(\lambda) \times Pe(\lambda)). \quad (2)$$

Therefore, from equations (1) and (2), difference value Is is represented by the following equation:

$$Is(\lambda)=Ion(\lambda)-Ioff(\lambda)=\log(1+Ps(\lambda))/Pe(\lambda)). \qquad (3)$$

Here, the irradiation unit 11 radiates light having λ1 to λ3 as center wavelengths. Accordingly, first difference value Is(λ1) is represented by log(1+Ps(λ1))/Pe(λ1)), second difference value Is(λ2) is represented by log(1+Ps(λ2))/Pe(λ2)), and third difference value Is(λ3) is represented by log(1+Ps(λ3))/Pe(λ3)).

In addition, when light having λ1 as a center wavelength, light having λ2 as a center wavelength and light having λ3 as a center wavelength have identical intensities of emission, irradiation intensities Ps(λ1) Ps(λ2) and Ps(λ3) have identical values. Accordingly, when the difference value Is is small, the intensity Pe(λ) of the external light is large. When the difference value Is is large, the intensity Pe(λ) of the external light is small. Thus, among difference values Is for the wavelength regions, a wavelength region in which the difference value Is is largest can be specified as a wavelength region in which the intensity of the external light is lowest.

Figure 3:
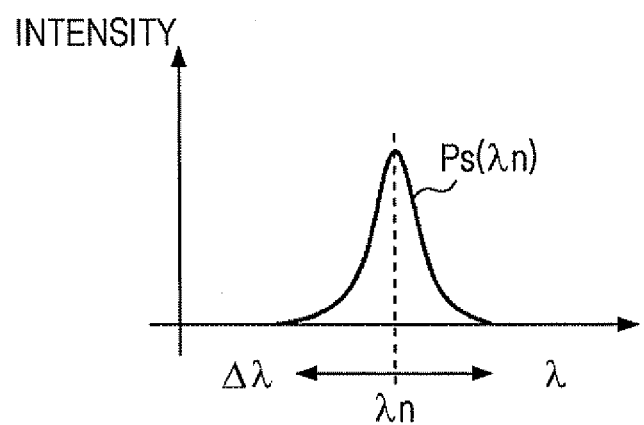
FIG. 3 is a graph showing the intensity $Ps(\lambda)$ of radiated light at specified wavelength $\lambda$.
Figure 4:
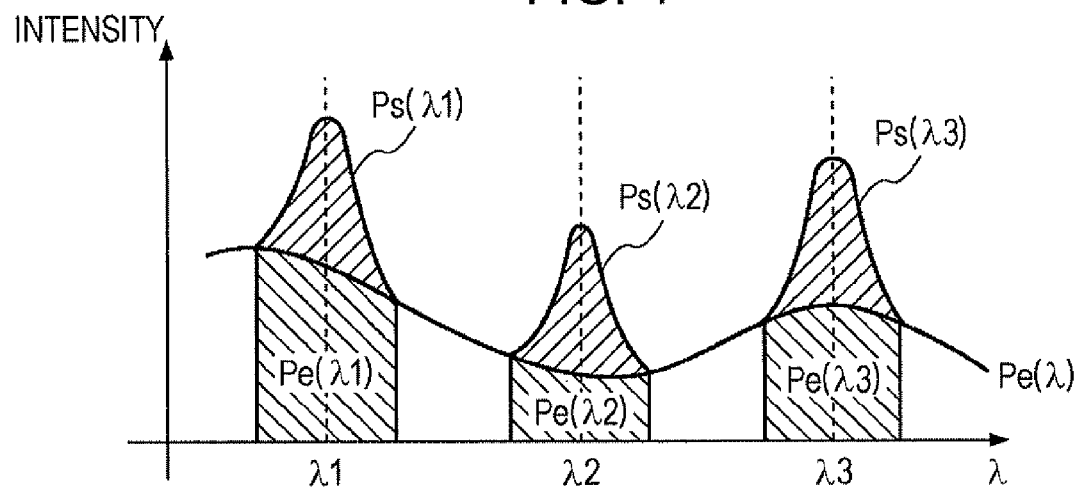
FIG. 4 is a graph showing the intensity $Pe(\lambda)$ at each wavelength and the intensity $Ps(\lambda)$ of the radiated light in each wavelength region.

Referring to FIGS. 3 and 4, a further description is given. As shown in FIG. 3, the irradiation unit 11 radiates light having wavelength width Δλ at center wavelength λn (n=1, 2, 3). In this case, the intensity of light radiated to the object O has a distribution for each wavelength as shown in FIG. 4. When comparing FIG. 4 with equation (3), Pe(λ1), Pe(λ2) and Pe(λ3), each representing a denominator in the logarithm in equation (3), correspond to the downward-sloping hatched portions in FIG. 4. Similarly, Ps(λ1), Ps(λ2) and Ps(λ3), each representing a numerator in the logarithm in equation (3), correspond to the upward-sloping hatched portions in FIG. 4.

As is clear from FIG. 4, among Ps(λ1)/Pe(λ1), Ps(λ2)/Pe(λ2) and Ps(λ3)/Pe(λ3), the largest value is Ps(λ2)/Pe(λ2), and the value of difference value Is(λ2) is greater than difference values Is(λ1) and Is(λ3). As described above, in a wavelength region having λ2 as a center wavelength, difference value Is is large. Accordingly, the calculation portion 16c specifies this wavelength region as a wavelength region in which the intensity of the external light is lowest.

In the wavelength region calculating unit 16 in this embodiment, the storage portion 16b stores the difference values. As is clear from equation (3), Is(λ), does not have any negative value. Accordingly, by storing the difference values in the storage portion 16b, the wavelength region calculating unit 16 can set a difference between wavelengths to be large. Therefore, the wavelength region calculating unit 16 can more accurately specify a wavelength region in which the intensity of the external light is low.

The irradiation control unit 17 increases the emission intensity of light having the wavelength region determined by the wavelength region calculating unit 16 in the light having wavelength regions, and controls the irradiation unit 11 to radiate the light having the wavelength regions. The power supply 18 supplies a driving current to the image pickup apparatus 10. Under the control of the irradiation control unit 17, the driving current from the power supply 18 is supplied to each light-emitting element in the irradiation unit 11. The irradiation control unit 17 includes an emission intensity determining portion 17a, an emission intensity storage portion 17b, and a current control portion 17c.

The emission intensity determining portion 17a determines the intensity of emission when the irradiation unit 11 radiates light having wavelength regions. The emission intensity determining portion 17a determines the intensity of emission in four levels from "0" to "3", in which "0" represents OFF, "1" represents a small intensity of emission, "2" represents an intermediate intensity of emission, and "3" represents a large intensity of emission. In addition, the emission intensity determining portion 17a determines a high intensity of emission for light having the wavelength region determined by the wavelength region calculating unit 16. For example, when it is determined that a wavelength region in which the intensity of the external light is lowest is λ1, the emission intensity determining portion 17a determines that the emission intensity of λ1 is "3" and determines that the emission intensities of λ2 and λ3 are "1".

The emission intensity storage portion 17b stores an emission intensity of light, having each wavelength, radiated from the irradiation unit 11. Whenever the emission intensity determining portion 17a determines an emission intensity, emission intensity information is input and stored in the emission intensity storage portion 17b.

The current control portion 17c controls the irradiation unit 11 based on the emission intensity determined by the emission intensity determining portion 17a. The current control portion 17c increases the emission intensity of light having the wavelength region determined by the emission intensity determining portion 17a and controls the irradiation unit 11 to radiate the light. At this time, even if the intensity of the light having the wavelength region determined by the emission intensity determining portion 17a is maximized, the current control portion 17c maintains the emission intensity of irradiation from the irradiation unit 11 to be constant. Accordingly, even in a case in which only the emission intensity of some wavelength region is increased, unnecessary power is not consumed for an increase in emission intensity.

Figure 5:
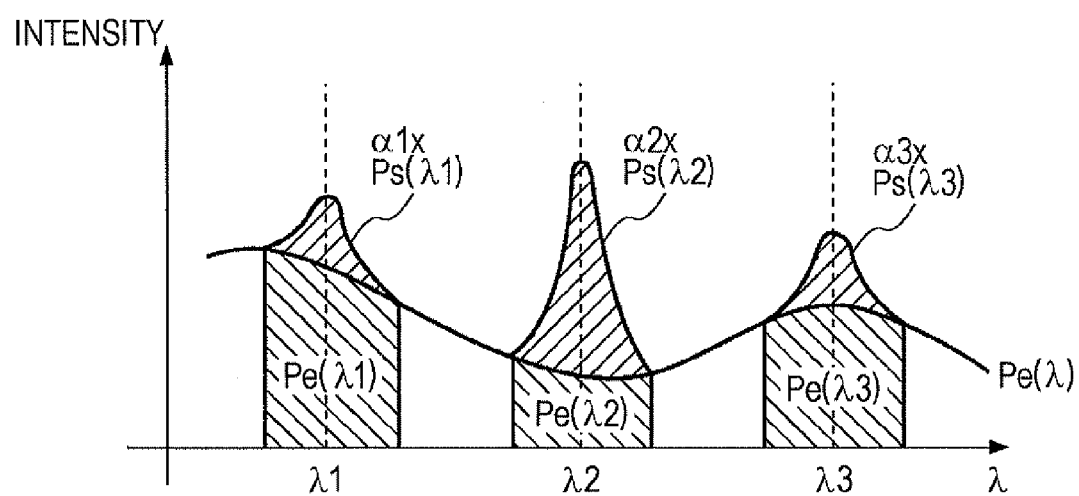
FIG. 5 is a graph showing the intensity $Pe(\lambda)$ of the external light at each wavelength and the intensity $\alpha n \times Ps(\lambda)$ of the radiated light at each wavelength region, and showing a state obtained after an emission intensity is changed according to the intensity of the external light.

FIG. 5 is a graph showing the intensity Pe(λ) of the external light at each wavelength and the intensity αn×Ps(λ) of the radiated light at each wavelength region. FIG. 5 shows a state obtained after the emission intensity of light radiated from the irradiation unit 11 is changed according to the intensity of the external light.

When the emission intensity determining portion 17a determines that an emission intensity of a wavelength region centered on λ2 is increased and determines that emission intensities of wavelength regions centered on λ1 and λ3 are decreased, the irradiation-intensity-to-wavelength characteristic shown in FIG. 4 changes to that shown in FIG. 5. In other words, the irradiation intensity of the wavelength region around λ2 is multiplied by α2, so that α2×Ps(λ2)/Pe(λ2). This value increases so as to be higher than Ps(λ2)/Pe(λ2), and second difference value Is(λ2) increases. This makes it possible to perform efficient image pickup. The representation λn (n=1, 2, 3, . . . ) is a number representing a change in emission intensity of the radiated light having center wavelength λn, where α1+α2+α3=1. Accordingly, when α2 increases, α1 and α3 decrease, and α1×Ps(λ1)Pe(λ1) is less than Ps(λ1)/Pe(λ1). This can apply to λ3. In particular, since α1+α2+α3=1, summation P of emission intensities is represented by the following equation and is always a constant value:

$$P=\alpha1\times Ps(\lambda1)+\alpha2\times Ps(\lambda2)+\alpha3\times Ps(\lambda3). \qquad (4)$$

This makes it possible to perform efficient image pickup according to the intensity of the external light while suppressing generated heat without increasing entire emission power. As shown in FIG. 5, when the current control portion 17c decreases an emission intensity of light having a wavelength region that is not determined by the wavelength region calculating unit 16, the current control portion 17c decreases the emission intensity without setting the emission intensity to "0".

Figure 6:
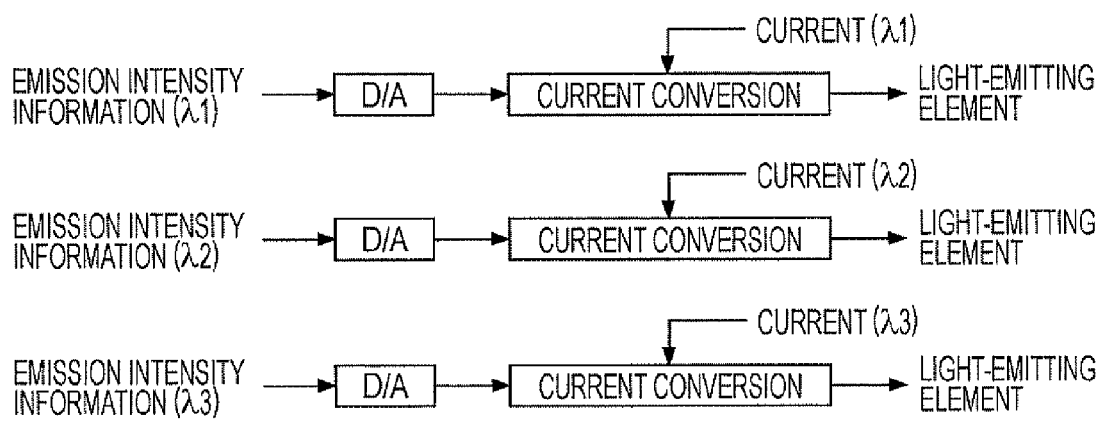
FIG. 6 is a first illustration of processing of a current control portion.
Figure 7:
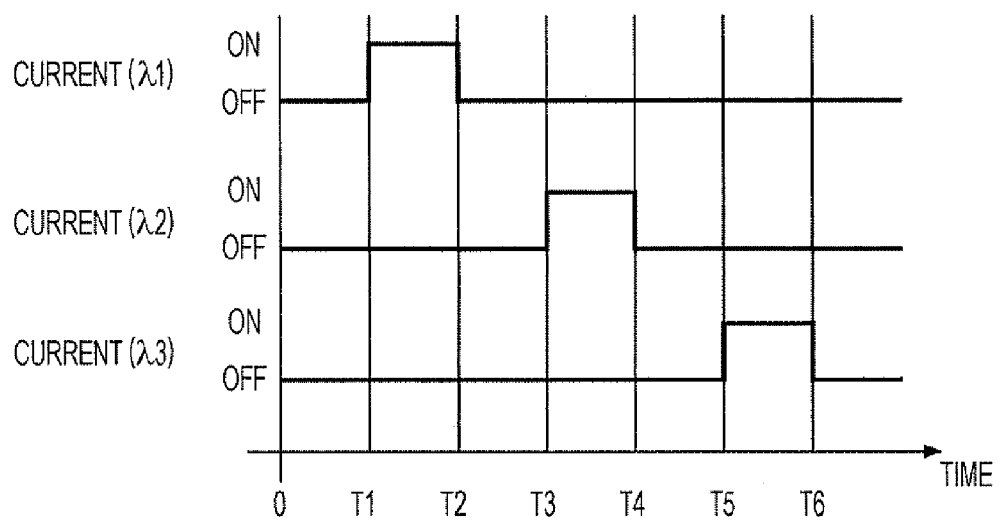
FIG. 7 is a second illustration of processing of the current control portion.

Specifically, the current control portion 17c controls irradiation of the irradiation unit 11 as shown in FIGS. 6 and 7. As shown in FIG. 6, the current control portion 17c receives emission-intensity information V(λ) determined by the emission intensity determining portion 17a and changes the emission-intensity information V(λ) into a voltage by performing digital-to-analog conversion on the emission-intensity information V(λ). The current control portion 17c supplies each light-emitting element with a current (λ) according to the emission-intensity information V(λ) by using the voltage obtained in the digital-to-analog conversion to control a transistor or the like. At this time, the current control portion 17c supplies the light-emitting element with the current from the power supply 18.

As shown in FIG. 7, the current control portion 17c supplies a current (λ) to the irradiation unit 11 in units of wavelengths of irradiation from the irradiation unit 11 by performing time-division control. Specifically, from time 0 to time T1, the current control portion 17c does not supply any current. This allows the camera 14 to obtain non-irradiation-mode picked-up-image data when no irradiation is performed by the irradiation unit 11. Next, from time T1 to time T2, the current control portion 17c supplies the current (λ1). This allows the camera 14 to obtain irradiation-mode picked-up-image data when light having a wavelength region having center wavelength λ1 is radiated by the irradiation unit 11.

Next, from time T2 to time T3, the current control portion 17c does not supply any current. This allows the camera 14 to obtain non-irradiation-mode picked-up-image data when no irradiation is performed by the irradiation unit 11. After that, from time T3 to time T4, the current control portion 17c supplies a current (λ2). This allows the camera 14 to obtain irradiation-mode picked-up-image data when light having a wavelength region having center wavelength λ2 is radiated by the irradiation unit 11. Next, from time T4 to time T5, the current control portion 17c does not supply any current. This allows the camera 14 to obtain non-irradiation-mode picked-up-image data when no irradiation is performed by the irradiation unit 11. After that, from time T5 to time T6, the current control portion 17c supplies a current (λ3). This allows the camera 14 to obtain irradiation-mode picked-up-image data when light having a wavelength region having center wavelength λ3 is radiated by the irradiation unit 11. Subsequently, the current control portion 17c time-divisionally supplies the current (λ) in the same manner.

Referring back to FIG. 1, the control unit 19 controls the entirety of the image pickup apparatus 10 and establishes synchronization of each unit. The adding unit 20 forms a difference image by adding the first difference value (λ1), second difference value (λ2) and third difference value (λ3) stored in the storage portion 16b and outputs the difference image to the display unit 30. The display unit 30 receives data of the difference image from the image pickup apparatus 10 and displays an image.

The calculation portion 16c determines a wavelength region in which the intensity of the external light is lowest based on the difference value. In addition to that, the calculation portion 16c determines a wavelength region in which the intensity of the external light is lowest based on information stored in the current control portion 17c. In the description of equation (3), αn is not considered. When the current control portion 17c increases an emission intensity of some wavelength region, as is clear from FIG. 5, the value of difference value Is for the wavelength region is large. Thus, if the first to third difference values are simply compared, a problem may occur when specifying a wavelength region in which the intensity of the external light is lowest. Accordingly, from the emission intensity (i.e., αn) of light in each wavelength region by the irradiation unit 11 in addition to the first to third difference values, the calculation portion 16c determines a wavelength region in which the intensity of the external light is lowest. In this manner, a wavelength region in which the intensity of the external light is lowest is more accurately determined.

In the description of equation (3), the magnitude of the intensity of the external light is determined based on the magnitude of a difference value without determining the intensity of the external light. Further, the calculation portion 16c may calculate the intensity of the external light and may determine a wavelength region in which the intensity of the external light is lowest. A method for calculating the intensity of the external light is described. First, a storage value Im for m times by the storage portion 16b can be represented by the following equation:

$$Im = m \times \log(1 + \alpha n \times Ps(\lambda n)/Pe(\lambda n)). \quad (5)$$

External light intensity Pe(λ) in each wavelength region can be represented by the following equations by transforming equation (5), that is, by:

$$Pe(\lambda 1) = \alpha 1 \times Ps(\lambda 1)/(10(Im/m) - 1); \quad (6)$$

$$Pe(\lambda 2) = \alpha 2 \times Ps(\lambda 2)/(10(Im/m) - 1); \text{ and} \quad (7)$$

$$Pe(\lambda 3) = \alpha 3 \times Ps(\lambda 3)/(10(Im/m) - 1); \text{ wherein} \quad (8)$$

α1 to α3, Ps(λ), Im and m are known values. Thus, the external light intensities in the wavelength regions can be determined by equations (6) to (8).

Figure 8A:
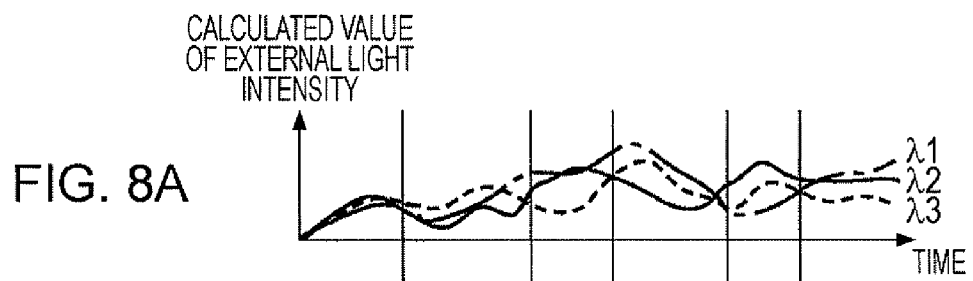
FIGS. 8A to 8F are graphs showing the outline of the operation of the image display system in the embodiment.
Figure 8B:
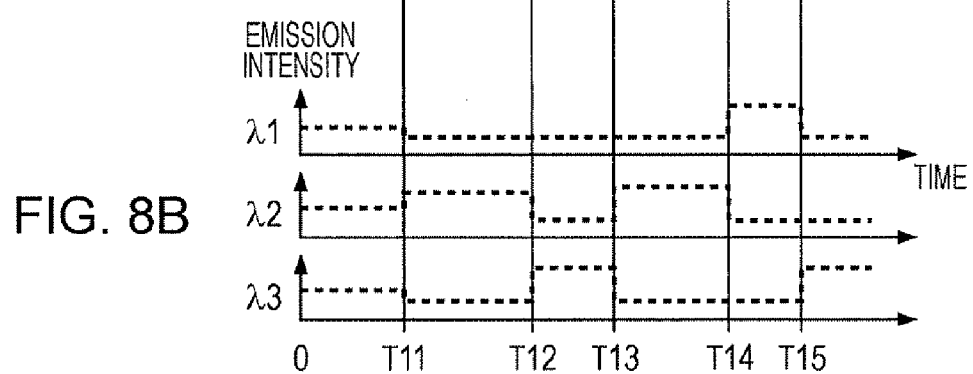

Next, an outline of the operation of the image display system 1 in this embodiment is described below. FIG. 8A shows external light intensities determined by the calculation portion 16c. FIG. 8B shows emission intensities determined by the emission intensity determining portion 17a in a time-change manner. FIGS. 8C to 8F separately show emission intensities determined by the emission intensity determining portion 17a.

Figures 8C, 8D, 8E, 8F:
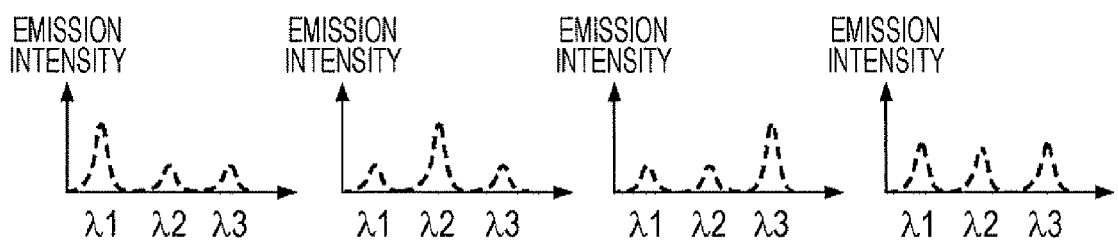

First, it is assumed that, at time 0, a power supply of the image display system 1 is turned on. At this time, external light intensities are not determined. As shown in FIGS. 8B and 8F, radiated light intensities of center wavelengths λ1 to λ3 are identical (the intensities are all set to "2": intermediate). After that, it is assumed that at time T11, the intensity of external light having wavelength λ2 is lowest. At this time, as shown in FIGS. 8B and 8D, the emission intensity determining portion 17a increases the intensity of radiated light having center wavelength λ2 (emission intensity "3": large) and decreases intensities of light having other wavelength components λ1 and λ3 (emission intensity "1": small). After that, up to time T12 the irradiation unit 11 time-divisionally radiates the light at the above intensities.

Next, it is assumed that at time 12 the intensity of external light having wavelength λ3 is lowest. At this time, as shown in FIGS. 8B and 8E, the emission intensity determining portion 17a increases the intensity of light having wavelength component λ3 (emission intensity "3": large) and decreases intensities of light having other wavelength components λ1 and λ2 (emission intensity "1": small). After that, up to time T13, the irradiation unit 11 time-divisionally radiates the light at the above intensities.

Next, it is assumed that at time T13 an intensity of external light having wavelength component λ2 is lowest. At this time, as shown in FIGS. 8B and 8D, the emission intensity determining portion 17a increases an intensity of wavelength component λ2 (emission intensity "3": large) and decreases intensities of light having other wavelength components λ1 and λ3 (emission intensity "1": small). After that, up to time T14, the irradiation unit 11 time-divisionally radiates the light at the above intensities.

Next, it is assumed that at time T14 the intensity of wavelength component λ1 of the external light is lowest. At this time, as shown in FIGS. 8B and 8C, the emission intensity determining portion 17a increases the intensity of external light having wavelength component λ1 (emission intensity "3": large) and decreases intensities of light having other wavelength components λ2 and λ3 (emission intensity "1": small). After that, up to time T15, the irradiation unit 11 time-divisionally radiates the light at the above intensities.

Next, it is assumed that at time T15 the intensity of wavelength component λ3 of the external light is lowest. At this time, as shown in FIGS. 8B and 8E, the emission intensity determining portion 17a increases the intensity of light having wavelength component λ3 (emission intensity "3": large) and decreases the intensities of light having other wavelength components λ1 and λ2 (emission intensity "1": small). Subsequently, the image display system 1 repeatedly executes the above-described processing.

Next, an example of the operation of the image display system 1 in this embodiment is described with reference to the flowchart of FIG. 9.

Figure 9:
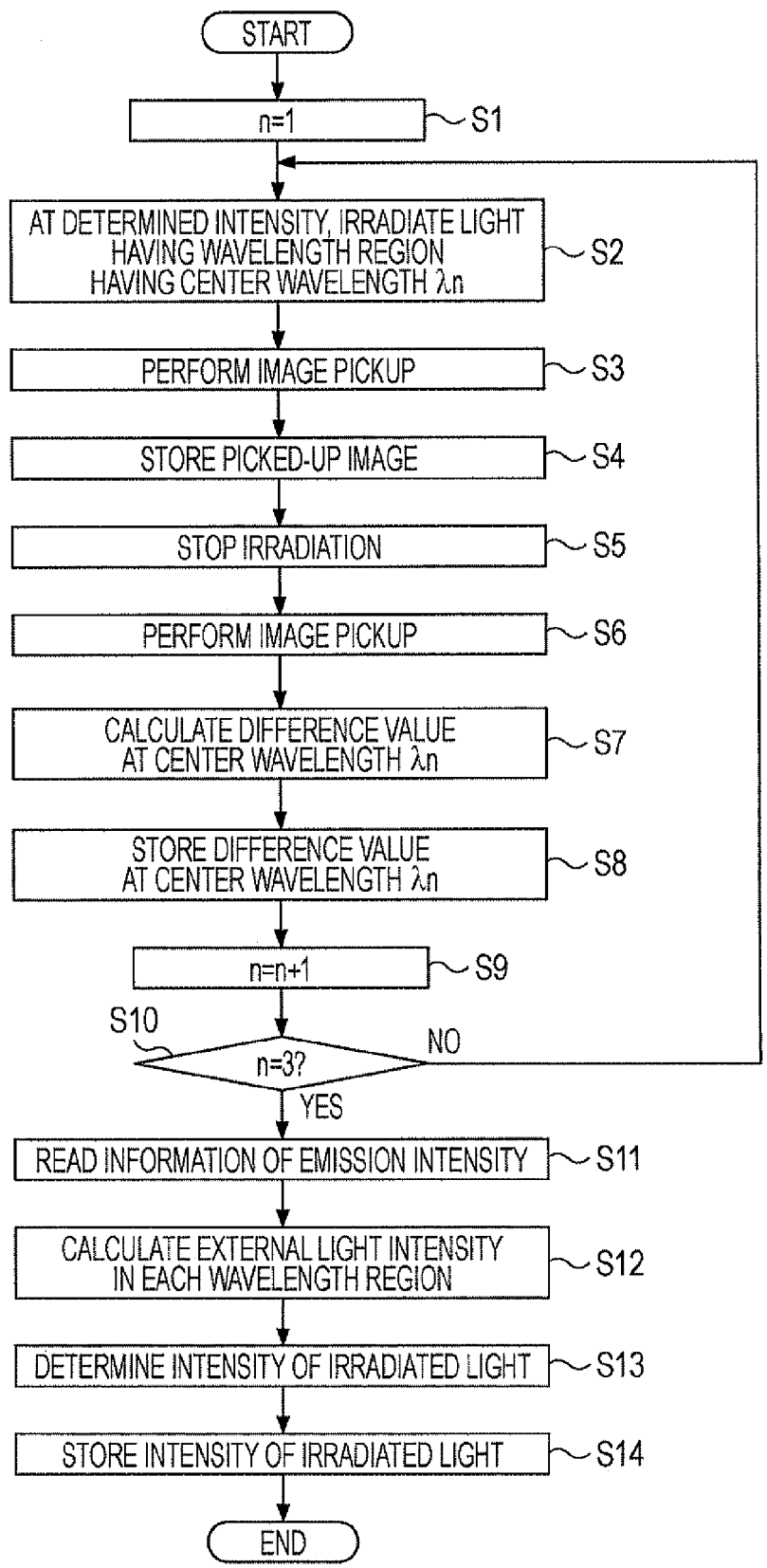
FIG. 9 is a flowchart showing an example of the operation of the image display system according to FIG. 1.

As shown in FIG. 9, in step S1 the image pickup apparatus 10 sets a number representing a wavelength region n to "1." In step S2 the irradiation control unit 17 controls the irradiation unit 11 to radiate, at a determined intensity, light having a wavelength region having center wavelength kn. In step S3 the camera 14 picks up an image of an area including the object O. This allows the image pickup apparatus 10 to obtain an image when light having a wavelength region with center wavelength λn is radiated. In step S4 the storage unit 15 stores the image picked up by the camera 14.

In step S5 the irradiation control unit 17 stops irradiation of the irradiation unit 11. In step S6 the camera 14 picks up an image of an area including the object O. This allows the image pickup apparatus 10 to obtain non-irradiation-mode picked-up-image data. In step S7 the difference calculating portion 16a calculates a difference value at center wavelength λn.

In step S8 the storage portion 16b stores the difference value at center wavelength λn. In step S9 number n, which represents the wavelength region, is incremented by the image pickup apparatus 10. In step S10 it is determined whether or not number n representing the wavelength region is "3", in this example. If n is not "3" (response is "NO" in step S10), the process returns to step S2.

Conversely, if n is "3" (response is "YES" in step S10), in step S11 the calculation portion 16c reads, from the current control portion 17c, information on the emission intensity of the light radiated in step S2.

In step S12 the calculation portion 16c calculates an external light intensity in each wavelength region. In step S13 the emission intensity determining portion 17a determines the emission intensity of the radiated light in each wavelength region based on the external light intensity determined in step S12.

In step S14 the emission intensity storage portion 17b stores information of the emission intensity determined in step S13. The process shown in FIG. 9 then ends. The process shown in FIG. 9 is repeatedly executed until the power supply of the image display system 1 is turned off.

As described above, according to the image pickup apparatus 10, the image display system 1 and the image pickup method of this embodiment, a wavelength region in which the intensity of external light is lowest is determined, and an emission intensity of light having the determined wavelength region is increased from an image obtained when light having wavelength regions is radiated and an image obtained when the light is not radiated. Therefore, light having a wavelength region in which the intensity of the external light is low, that is, light having a wavelength region that is hardly affected by the external light, can be radiated from the irradiation unit 11. This makes it possible to perform image pickup in accordance with the intensity of the external light.

In addition, differences between an image obtained when light having each wavelength region is radiated and an image obtained when the light is not radiated are determined for a plurality of wavelength regions. A wavelength region that has the largest difference value among difference values for the wavelength regions is determined as a wavelength region in which the intensity of the external light is lowest. Here, the difference values tend to decrease as the intensity of the external light increases. Accordingly, in the above manner, a wavelength region in which the intensity of the external light is lowest can be determined.

The difference values are determined for the individual wavelength regions a plural number of times, and cumulative values of the difference values are obtained separately for the individual wavelength regions. From the cumulative values, a wavelength region in which the intensity of the external light is lowest is determined. Here, the difference values do not become negative values. Thus, the cumulative values increase. This makes it possible to remarkably represent a difference, so that a wavelength region in which the external light is lowest can be accurately determined.

In addition, since the sum of emission intensities in each wavelength region is constant, efficient image pickup can be performed in accordance with the intensity of the external light while suppressing generated heat without increasing emission power of the entirety.

Further, light having a wavelength region that is not determined by the wavelength region calculating unit 16 is decreased without setting its emission intensity to "0". If the intensity of light having a specified wavelength region is set to "0", a difference value for the wavelength region cannot be determined, so that further determination of wavelength regions of radiated light is affected. However, in the above-described manner, efficient image pickup can be continued in accordance with the intensity of the external light without affecting further determination of wavelength regions of radiated light.

The invention is not limited to the above-described embodiments. For example, in the image display system 1 described, it is preferable that an optical axis of the camera 14 match an optical axis of light radiated from the irradiation unit 11, and it is preferable that an emission intensity of only each light-emitting element whose light reaches the object O be changed. Matching of the optical axes establishes matching between an x-y position of the light-emitting element and an x-y position of a picked-up image. Accordingly, the light-emitting element whose light reaches the object O can be specified. By changing the emission intensity of only the light-emitting element whose light reaches the object O, an image of the object O can be efficiently picked up without changing emission intensities of other light-emitting elements.

Although in the image display system 1 described the radiated light is near-infrared radiation, the invention is not limited to near-infrared radiation. For example, in sunlight, light having a wavelength region whose intensity is small may be radiated. This makes it possible to perform efficient image pickup during daytime hours. Similarly, in light of a mercury lamp and fluorescent light, light having a wavelength region whose intensity is small may be radiated. This makes it possible to perform efficient image pickup during night-time hours.

In the image display system 1 described, light having each wavelength region is time-divisionally radiated. However, by simultaneously radiating light having each wavelength region and using the optical filter 13 to transmit only light having a specified wavelength region, image pickup may also be performed. This produces an advantage similar to that obtained when light having each wavelength region is time-divisionally radiated.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An image pickup apparatus, comprising:
   an irradiation unit configured to radiate light having a plurality of wavelength regions to an object;
   an image pickup unit configured, for each wavelength region of the plurality of wavelength regions, to pick up a first image of the object at a particular wavelength region of the plurality of wavelength regions, the first image obtained in a presence of the radiated light and a second image of the object at the particular wavelength region of the plurality of wavelength regions, the second image obtained in an absence of the radiated light;
   a wavelength region calculating unit configured to determine a wavelength region among the plurality of wavelength regions in which intensity of external light is low based on intensity values corresponding to the first image and the second image at each wavelength region; and
   an irradiation control unit configured to control the radiated light from the irradiation unit to increase an emission intensity of light having the wavelength region determined by the wavelength region calculating unit.

2. The apparatus according to claim 1, wherein the irradiation control unit is configured to:
   control the radiated light from the irradiation unit to increase the emission intensity of light having the wavelength region determined by the wavelength region calculating unit to a value higher than emission intensities of light having the remaining plurality of wavelength regions.

3. The apparatus according to claim 1, wherein the wavelength region calculating unit is configured to:
   determine difference values between the first image and the second image for each wavelength region of the plurality of wavelength regions; and
   conclude that a wavelength region having the largest difference value among the difference values for each wavelength region is the wavelength region among the plurality of wavelength regions in which the intensity of the external light is low.

4. The apparatus according to claim 1 wherein the wavelength region calculating unit is configured to:
   determine difference values between the first image and the second image for each wavelength region of the plurality of wavelength regions a plural number of times; and
   obtain cumulative values of the difference values separately for each wavelength region; and wherein the wavelength region calculating unit is configured to determine the wavelength region among the plurality of wavelength regions in which intensity of external light is low based on the first image and the second image for each wavelength region by using the cumulative values.

5. The apparatus according to claim 1 wherein the irradiation control unit is configured to:
   maintain a sum of emission intensities of the radiated light as a constant; and
   control the radiated light from the irradiation unit to increase the emission intensity of light having the wavelength region determined by the wavelength region calculating unit and decrease emission intensities of light having the remaining plurality of wavelength regions.

6. The apparatus according to claim 5 wherein the irradiation control unit is configured to maintain the emission intensities of light of each of the remaining wavelength regions of the plurality of wavelength regions at values greater than zero.

7. The apparatus according to claim 1 wherein the wavelength region calculating unit is configured to determine the wavelength region among the plurality of wavelength regions as a wavelength region in which the intensity of the external light is lowest.

8. An image pickup apparatus, comprising:
   means for radiating light having a plurality of wavelength regions to an object;
   means for picking up, for each wavelength region of the plurality of wavelength regions, a first image of the object at a particular wavelength region of the plurality of wavelength regions, the first image obtained in a presence of the radiated light and a second image of the object at the particular wavelength region of the plurality of wavelength regions, the second image obtained in an absence of the radiated light;
   means for determining a wavelength region among the plurality of wavelength regions in which intensity of external light is low based on intensity values corresponding to the first image and the second image at each wavelength region; and
   means for controlling the radiating light means to increase an emission intensity of light having the wavelength region determined by the determining means.

9. An image display system, comprising:
   an image pickup apparatus, including:
      an irradiation unit configured to radiate light having a plurality of wavelength regions to an object;
      an image pickup unit configured, for each wavelength region of the plurality of wavelength regions, to pick up a first image of the object at a particular wavelength region of the plurality of wavelength regions, the first image obtained in a presence of the radiated light and a second image of the object at the particular wavelength region of the plurality of wavelength regions, the second image obtained in an absence of the radiated light;
      a wavelength region calculating unit configured to determine a wavelength region among the plurality of wavelength regions in which intensity of external light is low based on intensity values corresponding to the first image and the second image at each wavelength region; and
      an irradiation control unit configured to control the radiated light from the irradiation unit to increase an emission intensity of light having the wavelength region determined by the wavelength region calculating unit; and a display unit configured to display an image based on difference image data representing a difference between the first image and the second image.

10. A control method for an image pickup apparatus, the method comprising:
  picking up, for each wavelength region of a plurality of wavelength regions, a first image of an object at a particular wavelength region of the plurality of wavelength regions when radiated light having the plurality of wavelength regions is irradiated to the object;
  picking up, for each wavelength region of the plurality of wavelength regions, a second image of the object at the particular wavelength region of the plurality of wavelength regions in an absence of the radiated light;
  determining a wavelength region among the plurality of wavelength regions in which intensity of external light is low based on the first image and the second image at each wavelength region; and
  irradiating the radiated light in a state in which an emission intensity of light having the determined wavelength region is increased.

11. The method according to claim 10, further comprising:
  controlling the radiated light to increase the emission intensity of light having the determined wavelength region to a value higher than emission intensities of light having the remaining plurality of wavelength regions.

12. The method according to claim 11, further comprising:
  calculating difference values between the first image and the second image for each wavelength region of the plurality of wavelength regions; and
  concluding that a wavelength region having the largest difference value among the difference values for each wavelength region is the wavelength region among the plurality of wavelength regions in which the intensity of the external light is low.

13. The method according to claim 11, further comprising:
  calculating difference values between the first image and the second image for each wavelength region of the plurality of wavelength regions a plural number of times; and
  obtaining cumulative values of the difference values separately for each wavelength region; and wherein determining a wavelength region among the plurality of wavelength regions in which intensity of external light is low based on the first image and the second image for each wavelength region includes determining the wavelength region among the plurality of wavelength regions in which intensity of external light is low using the cumulative values.

14. The method according to claim 10, further comprising:
  maintaining a sum of emission intensities of the radiated light as a constant; and wherein irradiating the radiated light in the state in which an emission intensity of light having the determined wavelength region is increased includes:
    increasing the emission intensity of light having the determined wavelength region; and
    decreasing emission intensities of light having the remaining plurality of wavelength regions.

15. The method according to claim 14, further comprising:
  maintaining the emission intensities of light having the remaining plurality of wavelength regions at values greater than zero while decreasing the emission intensities of light having the remaining plurality of wavelength regions.

16. The method according to claim 10, further comprising:
  displaying an image based on difference image data representing a difference between the first image and the second image.

17. The method according to claim 10, further comprising:
  calculating difference values between the first image and the second image for individual wavelength regions of the plurality of wavelength regions; and
  concluding that a wavelength region having the largest difference value among the difference values for the individual wavelength regions is the wavelength region among the plurality of wavelength regions in which the intensity of the external light is low.

18. The method according to claim 17, further comprising:
  maintaining a sum of emission intensities of the radiated light as a constant; and wherein irradiating the radiated light in the state in which an emission intensity of light having the determined wavelength region is increased includes:
    increasing the emission intensity of light having the determined wavelength region; and
    decreasing emission intensities of light having the remaining plurality of wavelength regions.

19. The method according to claim 18, further comprising:
  maintaining the emission intensities of light of each remaining wavelength regions of the plurality of wavelength regions at values greater than zero while decreasing the emission intensities of light for the remaining wavelength regions of the plurality of wavelength regions.

20. The method according to claim 10, further comprising:
  calculating difference values between the first image and the second image for each wavelength region of the plurality of wavelength regions a plural number of times; and
  obtaining cumulative values of the difference values separately for each wavelength region; and wherein determining a wavelength region among the plurality of wavelength regions in which intensity of external light is low based on the first image and the second image for each wavelength region includes determining the wavelength region among the plurality of wavelength regions in which intensity of external light is low using the cumulative values.

* * * * *